United States Patent
Hubby, Jr.

(10) Patent No.: US 6,498,686 B2
(45) Date of Patent: Dec. 24, 2002

(54) SINGLE LIGHT VALVE PROJECTOR WITH REDUCED SEQUENTIAL COLOR ARTIFACTS

(75) Inventor: Laurence M. Hubby, Jr., Palo Alto, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/823,675

(22) Filed: Mar. 30, 2001

(65) Prior Publication Data

US 2002/0141069 A1 Oct. 3, 2002

(51) Int. Cl.[7] .............................................. G02B 27/12
(52) U.S. Cl. ....................................... 359/634; 359/639
(58) Field of Search ................................. 359/634, 636, 359/638, 639, 640, 649; 353/20, 31, 35; 348/336, 337, 338, 339

(56) References Cited

U.S. PATENT DOCUMENTS

| | | | | |
|---|---|---|---|---|
| 4,615,595 A | | 10/1986 | Hornbeck | 353/122 |
| 5,061,049 A | | 10/1991 | Hornbeck | 359/224 |
| 5,353,133 A | * | 10/1994 | Bernkopf | 349/10 |
| 5,715,029 A | | 2/1998 | Fergason | 349/194 |
| 5,751,383 A | * | 5/1998 | Yamanaka | 349/13 |
| 5,835,256 A | | 11/1998 | Huibers | 359/291 |
| 5,864,374 A | * | 1/1999 | Ito et al. | 348/757 |
| 5,959,704 A | * | 9/1999 | Suzuki et al. | 349/9 |
| 5,971,546 A | * | 10/1999 | Park | 353/38 |
| 6,005,722 A | | 12/1999 | Butterworth et al. | 359/712 |
| 6,020,940 A | * | 2/2000 | Ishikawa et al. | 349/8 |
| 6,243,055 B1 | * | 6/2001 | Fergason | 345/32 |
| 6,262,786 B1 | * | 7/2001 | Perlo et al. | 349/95 |
| 6,327,093 B1 | * | 12/2001 | Nakanishi et al. | 359/634 |
| 6,332,684 B1 | * | 12/2001 | Shibatani et al. | 353/31 |

OTHER PUBLICATIONS

Sony, LCD System Semiconductor Selection Guide, found at http://www.sony.co.jp/en/Products/SC–HP/GUIDE/PDF/LCDE.pdf.

* cited by examiner

Primary Examiner—Georgia Epps
Assistant Examiner—Saeed Seyrafi

(57) ABSTRACT

An optical display system having a lenticular array for focusing color light beams onto a plane forming a spatial mix of the colors of the beams and an optical translator for shifting the spatial mix of the colors of the plane is disclosed. The system divides white light into primary color beams. The primary color beams are directed to a lenticular array resulting in the color plane. The color plane is then reflected off a light valve and projected as a sub-frame. Multiple sub-frames, each having a permuted spatial color mix (compared to other sub-frames) are projected rapidly to generate a frame of color image.

22 Claims, 4 Drawing Sheets

SINGLE LIGHT VALVE PROJECTOR WITH REDUCED SEQUENTIAL COLOR ARTIFACTS

BACKGROUND

The present invention relates to the art of optical display systems. More particularly, the present invention relates to optical display systems having light valves and color displays.

In order to reduce the cost of light valve projection systems, it is common practice to employ an optical system with a single fast-responding light valve together with some sort of color selecting means (for example, a color wheel) operating in a sequential color mode. In such systems, the light valve rapidly displays monochrome frames of primary color information (generally three times faster than the normal refresh rate used for non-sequential systems.

For instance, to display a frame of a color image, the frame is displayed by projecting three rapid sub-frames, each sub-frame being of a single primary color. That is, to project one frame of a color image, a completely red image sub-frame, a completely green image sub-frame, and a completely blue image sub-frame are projected one after the other, very rapidly.

The rapid display of the monochrome sub-frame information on the light valve is synchronized with the colors passing through the color selecting means. This rapid succession of primary color images creates the impression of a single full color image in the mind of an observer due to the phenomenon of color persistence—the well-known fact that the human eye averages together information received over periods of a fifteenth of a second or so.

However, if the observer's eye is not stationary relative to the image during the display on such a device (due to natural rapid saccadic motion of the eye, for example), the relative motion will cause the successive primary color images to fail to overlap perfectly on the viewer's retina. The viewer will perceive incorrectly colored edges to bright objects under such circumstances, which will disappear when the relative motion ceases. This creates the annoying impression of a brief flash of color in situations where none was expected —a situation frequently referred to as "sequential color visual artifacts. " The phenomenon is worst for two or more small white objects spaced apart horizontally and displayed against a black background. The natural saccades of a viewer's eyes (which are most rapid in the horizontal direction) are frequently sufficient to cause strong and nearly continuous artifacts under such circumstances.

There is a need for a technique and an apparatus to alleviate sequential color artifacts.

SUMMARY

The need is met by the present invention. According to one aspect of the present invention, an optical display system includes a lenticular array for focusing color light beams onto a plane forming a spatial mix of the colors of the beams and an optical translator for shifting the spatial mix of the colors of the plane.

According to another aspect of the invention, a method of displaying a frame of a color image is disclosed. A first sub-frame is projected, the first sub-frame having a spatial mix of primary colors and a second sub-frame is projected, the second sub-frame having a permutated the spatial mix of the primary colors.

Other aspects and advantages of the present invention will become apparent from the following detailed description, taken in combination with the accompanying drawings, illustrating by way of example the principles of the invention.

DETAILED DESCRIPTION

Figure 1:
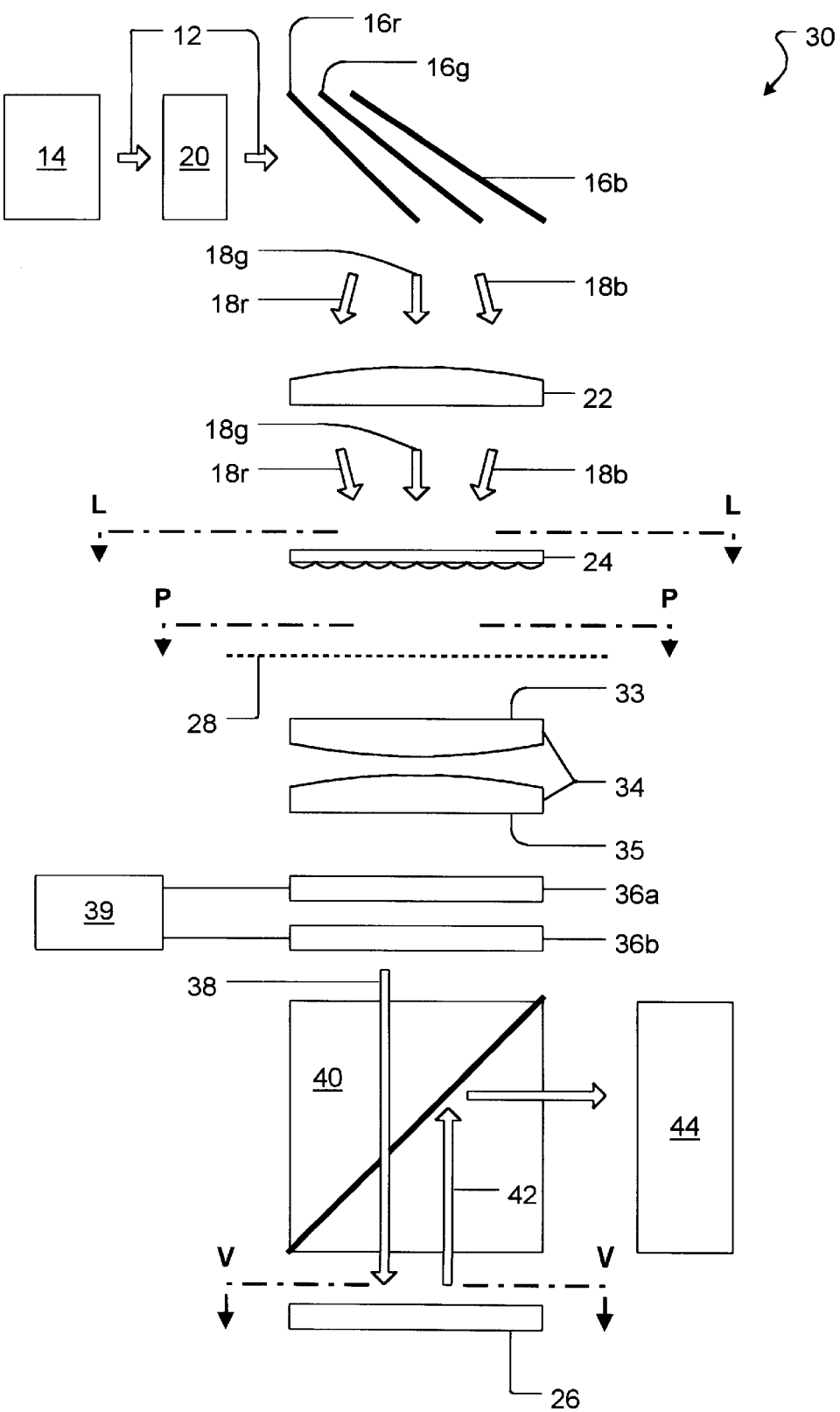
FIG. 1 is a simplified diagram of an apparatus according to one embodiment of the present invention.

As shown in the drawings for purposes of illustration, the present invention is embodied in an optical display system including a lenticular array for focusing color light beams onto a plane forming a spatial mix of the colors of the beams, and optical translator for shifting the spatial mix of the colors in the plane.

Under the present invention, a first sub-frame for projecting a frame of a color image is spatially mixed having lines of color in the repeating sequence of red-green-blue lines. Then, the second sub-frame is similarly spatially mixed but is shifted one pixel resulting in green-blue-red sequence. Finally, the third sub-frame is shifted again one pixel resulting in blue-red-green sequence.

Because each sub-frame is already a mix of the primary colors, the sequential color visual artifacts are greatly reduced.

Referring to FIG. 1, a simplified diagram of a display system 10 according to one embodiment of the present invention is illustrated.

Light 12 from a suitable light source 14 is divided into a plurality of color beams, one each of the primary colors used by the system 10, by a set of dichroic reflectors 16r, 16g, and 16b (collectively, 16). In the illustrated sample system, the light 12 is divided into three color beams of red 18r, green 18g, and blue 18b beams (collectively, 18) by using three dichroic reflectors 16r, 16g, and 16b, respectively. Use of the dichroic reflectors 16 to divide light into various components as shown is known in the art.

The light source 14 may be an arc lamp, some combination of light emitting diodes, some combination of lasers, or some combination of any two or all three. Whatever the type, the light source 14 should include means 20 for rendering the beams 18 produced spatially uniform such as a rod or fly's eye type integrator or a diffuser 20. Directed lines 12, 18, 28, 42 and such used in the Figures are used to illustrate general direction of the light and are not intended to represent ray traces.

The dichroic reflectors 16 are splayed apart with a small angle between them, as shown, in order to produce a number of beams 18, one of each primary color, propagating at slight angles to each other. Although the dichroic reflectors 16 are shown splayed with a larger distance between their ends that are closer to the lenticular array 24 and with condenser lens 22 located between them and the lenticular array 24, valid configurations also exist with the direction of the spay reversed and/or the condenser lens 22 replaced by more than one lens element and/or located elsewhere. Generally, the angular interval between beams 18 should be the same, and its value should be approximately $1/n^{th}$ of the acceptance angle of downstream optics, where n is the number of primary colors. The downstream optics includes all components below the line P-P of FIG. 1. The acceptance angle depends upon the speed (f#) of the projection lens 44. The relay optics 34 are designed to match the speed of the projection lens 44.

The acceptance angle is related to the f# of the projection lens 44 where acceptance half angle equals arc sin (1/(2*f#)). For example, if the projection lens has a maximum aperture of f2.8, then the acceptance half angle is 10.3°, if the lens is f1.4, then the angle is 20.9°. The operations of the lenticular array, including methods of determining the acceptance angle.

A condenser lens 22 then overlaps these primary color beams 18 at the location of a lenticular array 24. When the primary color beams 18 pass through the lenticular array 24, a spatially mixed color plane 28 ("color plane " for brevity) is formed at a determinable distance from the lenticular array 24.

The shape of the lenticular array 24 depends upon whether the color plane is to be a one-dimensional or a two-dimensional permutated array. In one embodiment that results in one-dimensional color permutation in the vertical direction (in order to achieve the best immunity to artifacts arising due to eye saccades in the horizontal direction), the lenticular array 24 consists of a one-dimensional array of tiny cylinder-shaped lenses with their axes of symmetry oriented in the horizontal direction, each of whose widths is chosen to be n times the pixel spacing in the vertical direction on the light valve 26. The total number of cylinder lenses in the array is preferably equal to 1+(N/n), where N is the number of pixels in the vertical direction on the light valve 26 and n is the number of primary colors. The one additional lens, compared to the (N/n) lenses necessary to produce sufficient color stripes for every row of pixels on the light valve 26, produces a color plane with one additional set of color stripes so that there will still be sufficient stripes to cover all rows of pixels after the color plane is translated by one pixel (n−1) times in order to affect the permutation of the primary colors illuminating each individual pixel during the various sub-fields. The alternative to having such extra color stripes is to use an array with (N/n) or fewer lenses and discard (n−1) pixel rows of the image information, thereby causing the color stripes corresponding to these pixel rows to become "extra " in the sense described above. If N is large and n is small, this may be judged to have an inconsequential effect on the resulting image.

In addition, the lenticular array 24 has overall dimensions that are about the same as those of the light valve 26 but slightly larger in the vertical direction in order to accommodate the one additional lens.

Figure 2A:
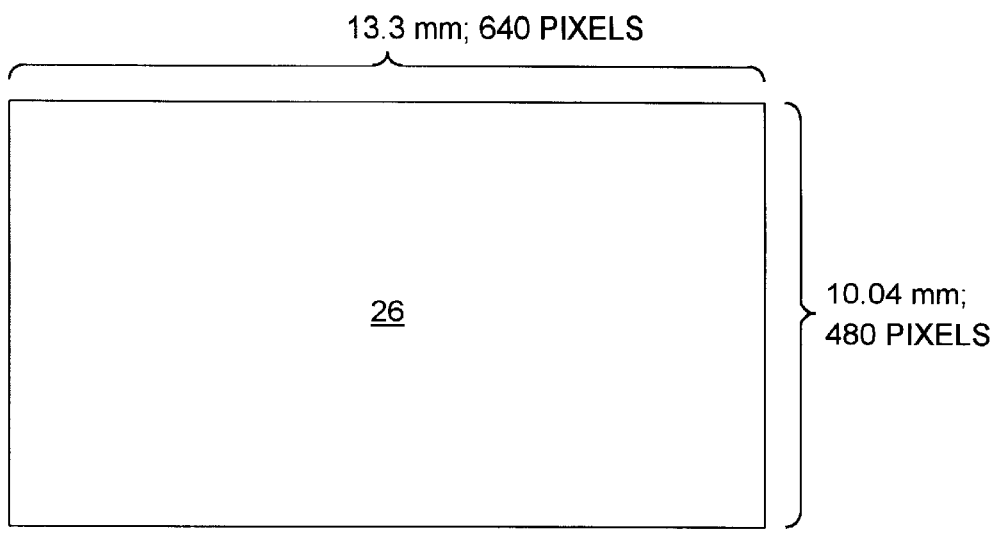
FIG. 2A is a front view of a sample light valve used as a sample.

For example, FIG. 2A illustrates a sample light valve 26 viewed along line V—V of FIG. 1.

The light valve is typically a reflective LCD (liquid crystal display) screen. In the illustrated example, n=3 and the light valve 26 is a rectangular grid of 640 by 480 pixels and is around 10 mm by 13.3 mm in a typical case. The present invention is not restricted to these resolutions or size.

Figure 2B:
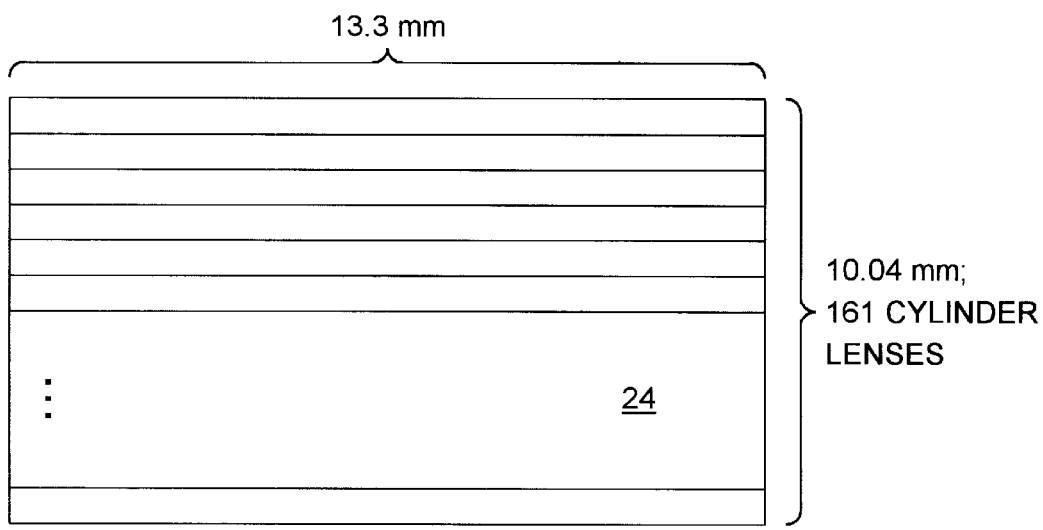
FIG. 2B is a front view of a lenticular array according to one embodiment of the present invention.

Then, the illustrated lenticular array 24 is an array of 161 cylinder shaped lenses (1+(480)/3, assuming three primary colors) and has a size similar to that of the light valve 26 as illustrated in FIG. 2B. If it were desired to mix the colors horizontally, rather then vertically, then the lenses would be arranged in the orthogonal direction relative to the direction illustrated in FIG. 2B but the number of cylinder lenses would be different than shown.

The lenticular array 24 is oriented such that the array direction is parallel to the plane in which the primary color beams 18 are splayed out. The cylinder lenses in the lenticular array 24 focus the illuminating beams 18 producing the spatially mixed color plane 28. Each of the cylinder lenses is n pixels wide. In the present example, n is three. The color plane 28 is a plane of color lines having a red-green-blue pattern.

Figure 3:
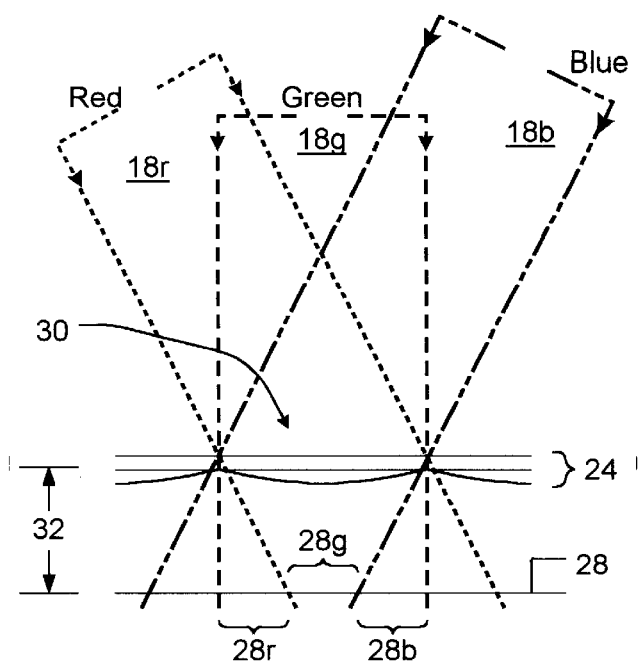
FIG. 3 illustrates behavior of light beams as they pass a lenticular array according to one embodiment of the present invention.

This is illustrated in FIG. 3. Referring to FIG. 3, when the primary color beams 18 pass through the cylinder lens 30 (one of many on the lenticular array 24), the color beams are focused on the color plane 28. The focal length 32 of the cylinder lenses in the array is chosen such that the finite widths—28r (red), 28g (green), and 28b (blue)—of each of the lines, which is determined by the combination of the angular width of each of the incoming beams and the focal length of the cylinder lenses, just fills one pixel spacing.

Thus, at the plane 28 shown, at one focal length 32 of the cylinder lenses of the lenticular array 24, a pattern of primary color stripes appears, one stripe for each column (or row, depending upon which way the lenticular array and dichroic reflector set are oriented) of the light valve 26.

Figure 4:
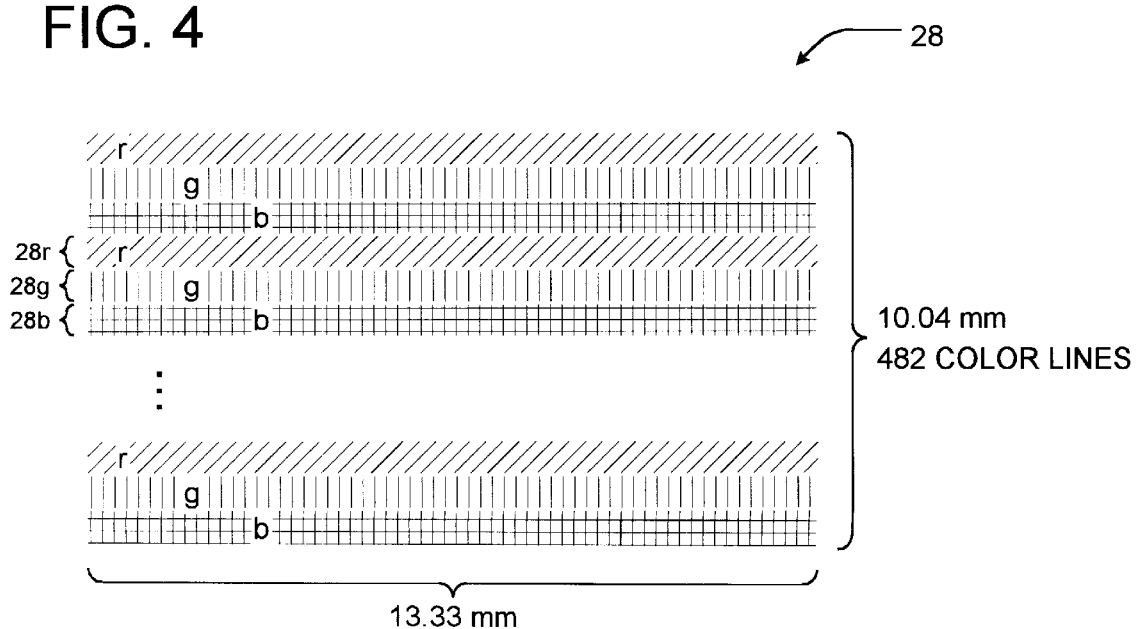
FIG. 4 illustrates a spatially mixed color plane in one embodiment of the present invention.

The resultant spatial color mix at the color plane 28 is illustrated in FIG. 4. The color plane 28 is a repeating pattern of red-green-blue lines having 482 total color lines in one direction.

The number of lines is larger by n−1 count because, as discussed below, the color lines are permutated by a translator. Each line is one pixel wide. In the other direction, normal to the first direction, the width is same as the light valve 26. In the present example, this is 13.3 mm.

Referring again to FIG. 1, a set 34 of relay optics may be used to transfer the color plane 28 at which the primary color stripe pattern appears to liquid crystal optical translators 36a and 36b. The transfer is done at 1:1 magnification in order to minimize any distortion in the color plane, which, if present, would cause the color stripes to be misaligned with the pixels of the light valve 26. Although refractive relay optics 34 is illustrated, any type of imaging optics could be used (reflective, diffractive, etc. or combinations such as refractive/diffractive).

The resultant color illumination at the light valve could have been produced by placing stripes of color filter material over the pixel columns of the light valve 26. In that case, an ordinary illumination system without dichroic filters 16 and lenticular array 24 would be used, the image translators 36 would need to be placed between the light valve 26 and the beamsplitter 40, and the image displayed on the light valve 26 during each sub-field would need to be translated by the same amount that the image translators 36 move the image fed to the projection lens 44, but in the oposite direction so that the sub-fields will properly overlap to form the final image. In the present configuration, however, no absorptive filters are used, thus the system is potentially more efficient than one employing conventional color filters. In addition, no modification to the light valve 26 is required to introduce the equivalent of color filtration.

Continuing to refer to FIG. 1, the color plane 28 then passes through optical translators 36a and 36b. The optical translators 36a and 36b are used to perform the spatial permutation intended to defeat sequential color artifacts. Each of the optical translators 36a and 36b can be activated independently by a controller 39. When activated, each of the optical translators 36a and 36b shifts the color plane 28 one pixel in the direction perpendicular to the color stripes in the color plane, thus permuting the color lines of the color plane 28. Devices of this type are known in the art. For example, see U.S. Pat. No. 5,715,029 issued to Fergason on Feb. 3, 1998.

The optical translators 36a and 36b affect a voltage-controlled translation of light passing through them by first controlling the state of polarization of the light with a liquid crystal cell, and then producing a polarization-dependent translation in a direction perpendicular to the direction of travel of the light by passing it through a double refracting crystal such as calcite cut to the appropriate orientation.

In the present example, two translators 36a and 36b are required in the case of three primary colors. This is because translations to three distinct permutations are required. First is the permutation shown in FIG. 4 as a repeating red-green-blue (r-g-b) pattern. Second, the pattern is shifted one pixel and a repeating green-blue-red (g-b-r) pattern results. Finally, the third repeating pattern is blue-red-green (b-r-g) pattern.

Thus, in the case of row permuted mixing, both translators off would yield one sub-frame (r-g-b), one translator on would produce the second sub-frame (g-b-r) by translating the entire stripe pattern one pixel spacing in the array direction, and both translators on would produce the third and final sub-frame (b-r-g) by translating the pattern one additional pixel spacing in the same direction.

That is, during the first sub-frame and along each column of pixels in the color plane 28, the 1st., 4th, 7th, 10th, etc. pixels will be from the red primary image, while the 2nd, 5th, 8th, 11th, etc. pixels will be from the green, and the 3rd, 6th, 9th, 12th, etc. pixels will be from the blue.

During the second sub-frame, the 1st., 4th, 7th, 10th, etc. pixels will be from the green primary image, while the 2nd, 5th, 8th, 11th, etc. pixels will be from the blue, and the 3rd, 6th, 9th, 12th, etc. pixels will be from the red.

During the third sub-frame, the 1st., 4th, 7th, 10th, etc. pixels will be from the blue primary image, while the 2nd, 5th, 8th, 11th, etc. pixels will be from the red, and the 3rd, 6th, 9th, 12th, etc. pixels will be from the green.

These three sub-frames are displayed for every frame of the color image to be displayed. Thusly, during the display of successive sub-frames, the order of the displayed colors is permuted. That is, during the second sub-frame, the first pixel and every third successive pixel along any vertical column are green, while the second and every third successive pixel are blue, while the third and every successive third pixel is red. During the display of the third sub-frame, the order along any column becomes, blue, red, green. Thus, after the display of three sub-frames, the entirety of all three primary color images has been displayed.

This is an example of mixing the primary colors in the vertical direction only (row permuted mixing). It is, of course, possible to also permute the order of the colors from one column to the next in the image during the display of any given frame (row and column permuted mixing).

It would also be possible to place the translators at locations in the system other than that shown. Which locations would be suitable depends upon the exact nature of the light valve and projection optics used. In the case of polarization sensitive light valves or polarization sensitive projection screens, an additional liquid crystal polarization rotating cell may be required following the second translator in order to provide the output polarization state that is the one required by the remainder of the system, regardless of the translation that may be selected. After passing through the image translators, the translated color plane 38 is polarized in a first direction.

Light from the translated color plane, represented by directed line 38, passes through a polarizing beam splitter (PBS) 40. Then, it reflects off the light valve 26 that modulates image information on to it and turns the translated color plane 38 into a second polarization that is orthogonal to the first polarization. The reflected color plane is represented by directed line 42. The reflected color plane 42, being polarized in the second direction, is reflected by the PBS 40 and is directed toward some projection optics 44 such as a projection lens 44.

The image displayed on the light valve 26 is appropriately assembled from the full color image information, for example pixels receiving illumination of a given primary color during a particular sub-frame must always be driven by the light valve address circuitry with the correct corresponding image information.

The operations of the display system 10 of the present invention are as follows: Referring again to FIG. 1, the light 12 generated by the light source 14 and rendered uniform. The uniform light is divided into a plurality of primarily color beams 18. To divide the light, dichroic reflectors 16 are used. The separated color beams 18 are converged toward the lenticular array 24 and focused into a sub-frame having a first spatial mix of the primary colors. In the example discussed above, the sub-frame is the color plane 28 as illustrated in FIG. 4 and having a red-green-blue pattern. This color plane 28 then passes through the optical translators 36a and 36b and the PBS to reflect off the light valve 26, acquiring the color image to be displayed, and is projected via the projection optics 44.

Next, a second sub-frame is projected. To project the second sub-frame, the color plane 28 is permutated by the optical translators 36a and 36b. For the present example, the permutated spatial mix may have a green-blue-red pattern. Then, a third sub-frame is projected, the sub-frame having blue-red-green spatial mix pattern.

Figure 5A:
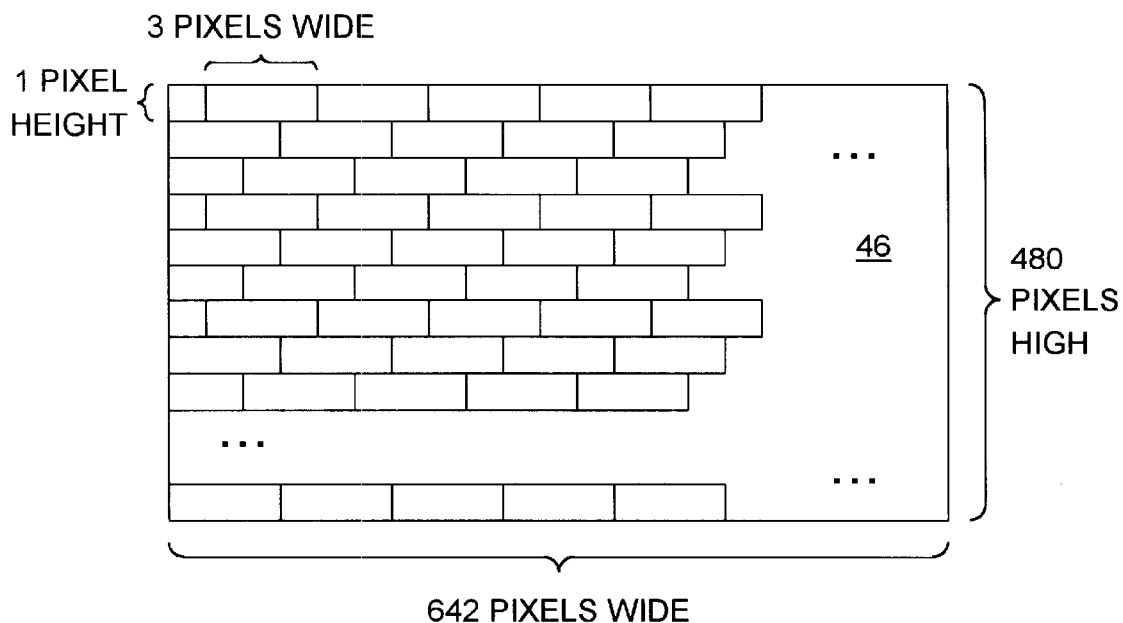
FIG. 5A is a front view of a lenticular array according to another embodiment of the present invention.

The spatial permutation may be in the horizontal direction (column permutated mixing), a vertical direction (row permutated mixing), or both the horizontal and the vertical directions (column and row permutated mixing). To spatially mix in both the horizontal and vertical directions, a two dimensional array of small cylindrical lenses 46 of FIG. 5A may be used. Referring to FIG. 5A, one direction of spatial permutation is accomplished by the action of cylinder lenslets, as described previously, while the other direction is accomplished by dividing the cylinder lenslets into single pixel wide lines in the direction perpendicular to their cylinder axes, and offsetting successive lines of lenslets by one pixel along their length relative to the line of image pixels to which they correspond. In FIG. 5A the lenslet cylinder axes have been chosen vertical, and the offset single pixel wide lines of lenslets run horizontal, however the opposite choice could have been made and would produce the same color plane pattern. The array 46 includes offset rows of lenslets one pixel high and three pixels wide. The width of the lenslets is determined by the number of primary color beams used. For the present example light valve 26 having 480 by 640 pixels, the lenticular array 46 is 480 rows and has a sufficient number of lenslets in each row to produce a color plane 642 pixels wide.

Figure 5B:
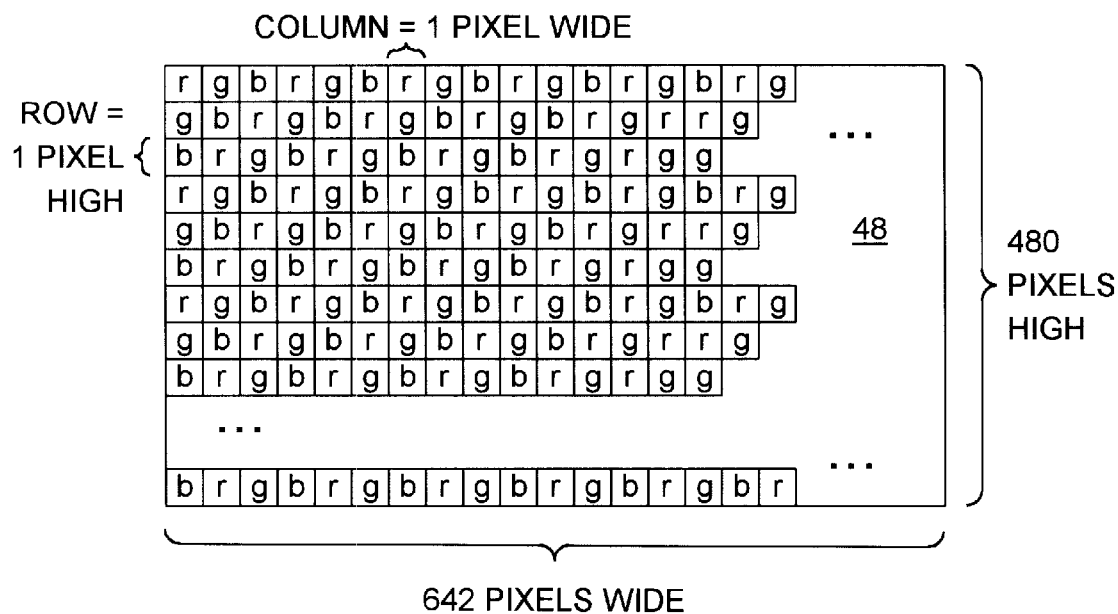
FIG. 5B illustrates a spatially mixed color plane in another embodiment of the present invention.

The resulting spatially mixed color plane 48 is illustrated in FIG. 5B with each row of the pixels having spatially mixed color sequence. In FIG. 5, each row is a spatially mixed color sequence that is differently permutated than the row above it and the row below it. The color plane 48 is used as the first sub-frame. For the second sub-frame, the entire color plane is permutated by permutating each of the rows one pixel.

From the foregoing, it will be appreciated that the present invention is novel and offers advantages over the current art. The present invention results in a higher projected display quality because it alleviates the artifacts. Although a specific embodiment of the invention is described and illustrated above, the invention is not to be limited to the specific forms or arrangements of parts so described and illustrated. For example, the spatial mixing of the color can be implemented using a color plane having color lines of two or more pixels wide. This may be sufficient for some applications; however, the optimum patterns for suppressing sequential color artifacts are those that intermix the primary colors with the maximum possible spatial frequency. In the example case, this is spatial mixing using one pixel wide color lines. The invention is limited by the claims that follow.

What is claimed is:

1. An optical display apparatus comprising:
   a lenticular array focusing color light beams to form a first color plane having a spatial mix of colors for a sub-frame of an image frame; and
   an optical translator coupled to select a second color plane having a permutated spatial mix of colors for a subsequent sub-frame of the image frame.

2. The apparatus of claim 1 wherein the lenticular array includes cylindrical lenses.

3. The apparatus of claim 1 wherein the lenticular array includes lenslets.

4. The apparatus of claim 1 wherein each color light beam is a selected one of a red, a green, and a blue light beam.

5. The apparatus of claim 1 wherein each color light beam is a primary color light beam.

6. The apparatus of claim 1 wherein the optical translator is a liquid crystal optical translator.

7. The apparatus of claim 1 further comprising:
   a light source providing white light; and
   a color divider for dividing the white light into the color light beams.

8. The apparatus of claim 7 wherein the color divider comprises a set of dichroic reflectors.

9. The apparatus of claim 7 further comprising a diffuser for diffusing the white light.

10. The apparatus of claim 1 further comprising relay optics to transmit the light lines of the color plane toward a light valve.

11. The apparatus of claim 1 further comprising:
    a polarizing beam splitter (PBS);
    a projection lens; and
    a light valve, wherein the PBS redirects any light lines reflected from the light valve after previously passing through the PBS toward the projection lens.

12. A method of displaying a frame of a color image, comprising the steps of:
    projecting a first sub-frame having a first spatial mix of primary colors; and
    projecting a second sub-frame having a second spatial mix of primary colors, wherein the first and second sub-frames are sequentially projected, wherein the first and second spatial mixes are permutations of each other.

13. The method of claim 12 further comprising the step of projecting a third sub-frame having a third spatial mix of primary colors, wherein the first, second, and third spatial mixes are permutations of each other.

14. The method of claim 12 wherein the primary colors include red, green, and blue.

15. The method of claim 12 wherein the spatial mix of each sub-frame is in a horizontal direction corresponding to a column permutated mixing of primary colors.

16. The method of claim 12 wherein the spatial mix of each sub-frame is in a vertical direction corresponding to a row permutated mixing of primary colors.

17. The method of claim 12 wherein the spatial mix of each sub-frame is in both vertical and horizontal directions corresponding to column and row permutated mixing of primary colors.

18. The method of claim 12 wherein the spatial mix of the primary colors is generated by:
    generating light; and
    dividing the light into a plurality of color light beams, each color light beam corresponding to a primary color, the color light beams propagating at a slight angle to each other; and
    converging the color light beams onto a lenticular array.

19. The method of claim 18 wherein the light is divided by at least one dichroic reflector.

20. The method of claim 18 wherein the light is divided into red, green, and blue color light beams.

21. The method of claim 18 wherein the lenticular array includes an array of cylindrically shaped lenses.

22. The method of claim 12 wherein the permutation is effected by an optical translator.

* * * * *